(No Model.)

T. WHITE.
HORSE DETACHER.

No. 362,341.  Patented May 3, 1887.

WITNESSES:
John A. Ellis.
C. Sedgwick

INVENTOR:
T. White
BY Munn & Co.
ATTORNEYS.

UNITED STATES PATENT OFFICE.

THOMAS WHITE, OF PEEKSKILL, NEW YORK.

HORSE-DETACHER.

SPECIFICATION forming part of Letters Patent No. 362,341, dated May 3, 1887.

Application filed March 17, 1887. Serial No. 231,273. (No model.)

*To all whom it may concern:*

Be it known that I, THOMAS WHITE, of Peekskill, in the county of Westchester and State of New York, have invented a new and Improved Horse-Detaching Device, of which the following is a full, clear, and exact description.

The object of my invention is to provide a practical device whereby a horse may be instantly detached from a vehicle by a person in the vehicle, to avoid danger in case the horse becomes unmanageable; and to this end my invention consists, principally, in providing the whiffletree with bolts to hold the traces, combined with levers connected to the bolts and provided with suitable lines reaching into the vehicle, so that a slight pull upon the same will withdraw the bolts and release the traces.

My invention also consists of sliding holdback-sleeves applied to the thills, to which sleeves the holdback-straps may be attached, so that when the traces are detached the sleeves will slide off from the thills, and thus wholly release the horse from the vehicle.

The invention also consists of the construction, arrangement, and combination of parts, all as hereinafter described and claimed.

Reference is to be had to the accompanying drawings, forming a part of this specification, in which similar letters of reference indicate corresponding parts in all the figures.

Figure 1:
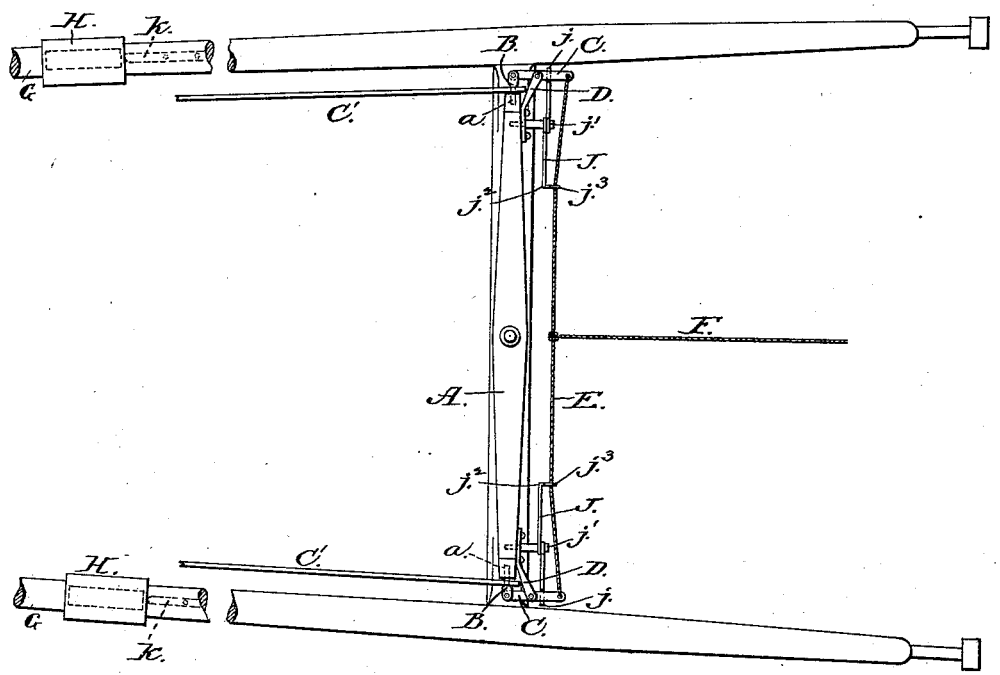
Figure 2:
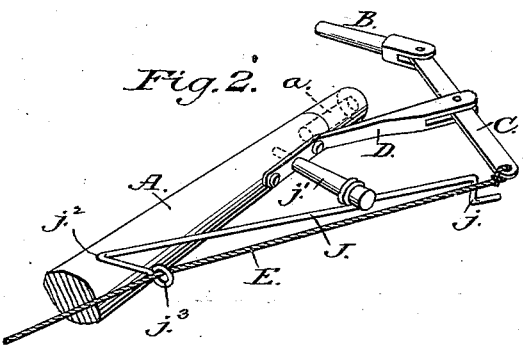
Figure 3:
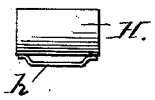

Figure 1 is a plan view of a pair of thills and whiffletree having my invention applied thereto, showing, also, the ends of the traces, the parts being in position to hold the traces to the whiffletree. Fig. 2 is a perspective view of one end of the whiffletree, showing the parts in position to release the trace; and Fig. 3 shows one of the thill holdback-sleeves removed.

The whiffletree A is formed at each end with a socket, $a$, to receive the bolts B, which pass through the traces C' and enter the sockets, to serve as retainers in attaching the traces to the whiffletree, as shown clearly in Fig. 1. The bolts B are each hinged to a lever, C, pivoted to a bent arm, D, secured to the whiffletree, so that the lever is held a short distance beyond the end of the whiffletree. The rear ends of the two levers C C are connected together by a cord or wire, E, and to the center of this cord or wire is attached a second cord, F, which leads into the vehicle or to within convenient reach of the driver, so that by drawing upon this cord the rear ends of the levers may be drawn toward each other and their opposite ends carried outward, which will withdraw the bolts B from the sockets $a$ and let go the traces.

Upon the thills G are placed loosely the holdback-sleeves H, provided with loops $h$ at their under surfaces for holding the holdback-straps of the harness. (Not shown.) These sleeves H come against the holdback-stops $k$ on the thills, which prevent the thills from sliding too far through the sleeves. When the traces C are released, by pulling upon the cords F E the sleeves H slide off from the thills, and thus wholly detach the horse from the vehicle.

To prevent the bolts B from jarring out of the sockets $a$ of their own accord, I provide each end of the whiffletree with a locking device, J, consisting of a rod pivoted upon the pin $j'$, attached to the whiffletree and bent at its outer end to form a shoulder, $j$, and at its inner end to form the arm $j^2$ and eye $j^3$, through which latter the cord or wire E passes. When the cord or wire E is in its normal condition and the pin B inserted in the recess $a$, the shoulder $j$ stands in line with the lever C, as shown in Fig. 1, and thus locks said lever, so that it cannot be moved to withdraw the pin B without first depressing the outer end of the rod. In unhitching the horse in the usual way, this can easily be done by hand. When the cord F is pulled, the upward movement of the cord E in the center will automatically lift the inner or adjacent ends of both rods J and depress the shoulders $j$ out of line with the levers C C, and thus permit their rear ends to be drawn inward, which will detach the traces, as above described.

Having thus fully described my invention, I claim as new and desire to secure by Letters Patent—

1. The combination, with the whiffletree having end sockets, $a$, of the pivoted levers C, bolts B, hinged to the levers C, and the cords or wires E F, arranged to operate substantially as described.

2. The whiffletree A, having end sockets, $a$, and provided with the arms D, in combination with centrally-fulcrumed levers C, the bolts B, hinged to the levers C, and the cords or wires E F, arranged substantially as described.

3. The combination, with the levers C, bolts B, and cords or wires E F, of the pivoted fastening-rods J, engaged by the cord E, substantially as described.

4. The whiffletree A, having end sockets, $a$, arms D, and pivots $j$, in combination with the levers C, bolts B, rods J, and cords or wires E F, all arranged to operate substantially as and for the purposes set forth.

THOMAS WHITE.

Witnesses:
JOHN H. WHITE,
GEO. W. McCORMICK.